United States Patent
Tagaya

(10) Patent No.: US 11,084,458 B2
(45) Date of Patent: Aug. 10, 2021

(54) STEERING DEVICE

(71) Applicant: YAMADA MANUFACTURING CO., LTD., Kiryu (JP)

(72) Inventor: Naohiro Tagaya, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 269 days.

(21) Appl. No.: 16/424,152

(22) Filed: May 28, 2019

(65) Prior Publication Data

US 2019/0389424 A1 Dec. 26, 2019

(30) Foreign Application Priority Data

Jun. 22, 2018 (JP) .............................. JP2018-118949

(51) Int. Cl.
*B60R 25/0215* (2013.01)
*B62D 5/00* (2006.01)

(52) U.S. Cl.
CPC ........ *B60R 25/02153* (2013.01); *B62D 5/001* (2013.01)

(58) Field of Classification Search
CPC .......................... B62D 5/001; B60R 25/02153
USPC ............................ 180/400; 70/252, 186, 182
See application file for complete search history.

(56) References Cited

U.S. PATENT DOCUMENTS

| | | | | |
|---|---|---|---|---|
| 4,854,141 A * | 8/1989 | Haldric | ............. | B60R 25/02107 70/182 |
| 6,076,382 A * | 6/2000 | Naganuma | ............... | B60R 25/02 70/186 |
| 7,107,801 B2 * | 9/2006 | Chartrain | .......... | B60R 25/02107 464/162 |
| 7,127,921 B2 * | 10/2006 | Kinme | .................... | B60R 25/02 70/252 |
| 7,604,254 B2 * | 10/2009 | Pieronczyk | ....... | B60R 25/02153 180/277 |
| 7,654,166 B2 * | 2/2010 | Heo | ....................... | B62D 3/123 74/409 |
| 8,256,252 B2 * | 9/2012 | Okada | .................... | B60R 25/02 70/182 |
| 10,759,382 B2 * | 9/2020 | Huang | .................... | B62H 5/06 |
| 2008/0087056 A1 * | 4/2008 | Tsukazaki | ......... | B60R 25/02153 70/182 |

(Continued)

FOREIGN PATENT DOCUMENTS

| | | | | |
|---|---|---|---|---|
| DE | 19719343 C1 * | 10/1998 | ....... | B60R 25/02153 |
| DE | 102013013542 A1 * | 2/2015 | ....... | B60R 25/02153 |

(Continued)

*Primary Examiner* — Ruth Ilan
*Assistant Examiner* — Myles A Harris
(74) *Attorney, Agent, or Firm* — McGinn IP Law Group, PLLC

(57) ABSTRACT

A steer-by-wire steering device includes a steering shaft 7; a rotation-restricting member A including an annular main cylindrical portion 1 mounted on the steering shaft 7 and at least one main ridge portion 2 formed on an outer periphery of the main cylindrical portion 1; an engagement member 6 configured to move in proximity to and away from the rotation-restricting member A; and a cushioning member B. The engagement member 6 and the at least one main ridge portion 2 are configured to come in contact with each other through the cushioning member B in conjunction with rotation of the steering shaft 7.

7 Claims, 6 Drawing Sheets

(56) References Cited

U.S. PATENT DOCUMENTS

| | | | | |
|---|---|---|---|---|
| 2009/0064739 A1* | 3/2009 | Trischberger | ..... | B60R 25/02153 70/237 |
| 2013/0067970 A1* | 3/2013 | Goshima | ........... | B60R 25/02153 70/187 |
| 2019/0329816 A1* | 10/2019 | Ko | ....................... | B62D 5/0445 |
| 2019/0344751 A1* | 11/2019 | Okada | ................. | B60R 25/0215 |
| 2021/0094507 A1* | 4/2021 | Turek | .................. | B60R 25/0211 |

FOREIGN PATENT DOCUMENTS

| | | | | | |
|---|---|---|---|---|---|
| DE | 102016206610 A1 | * | 10/2017 | ............. | B62D 5/006 |
| GB | 2575994 A | * | 2/2020 | ............. | B62D 5/001 |
| JP | 2010-162983 A | | 7/2010 | | |

* cited by examiner

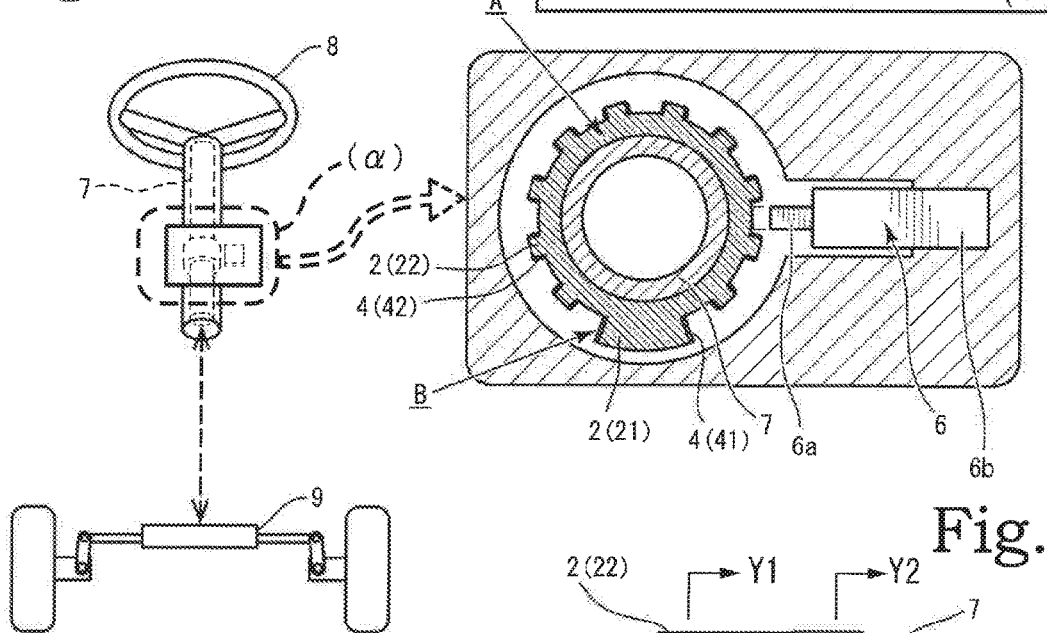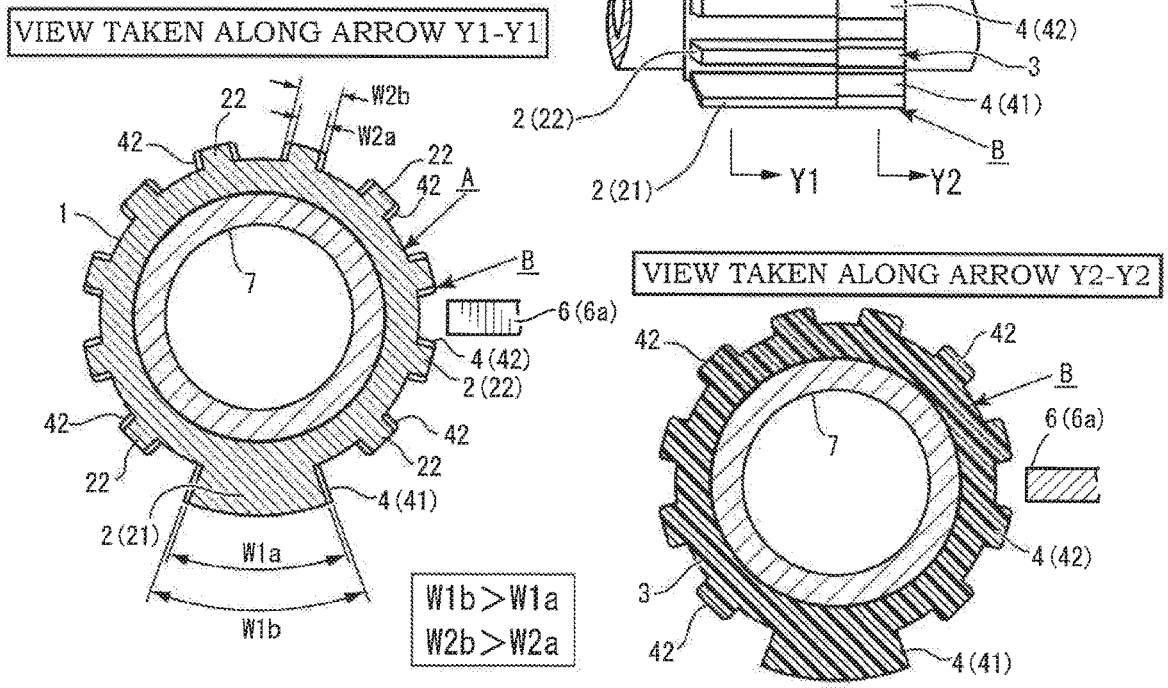

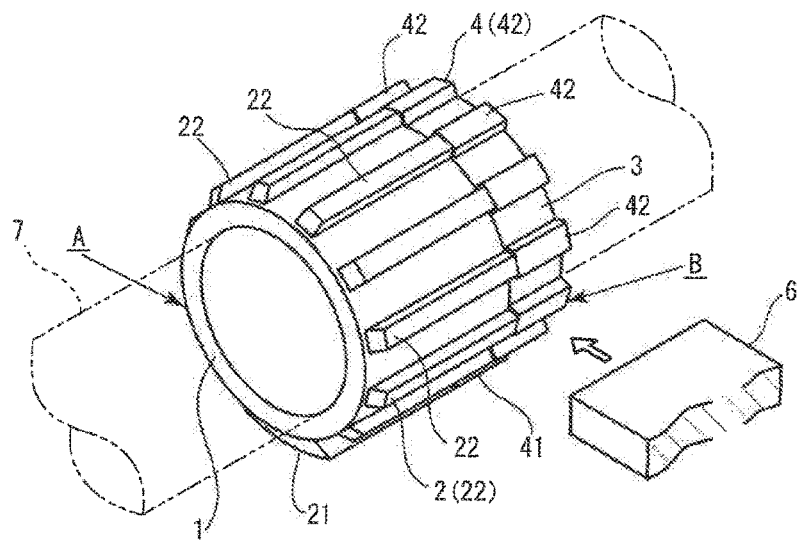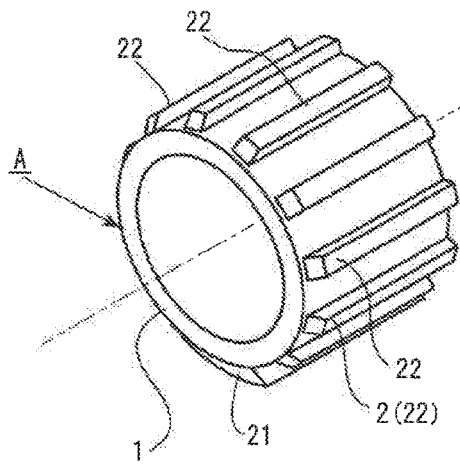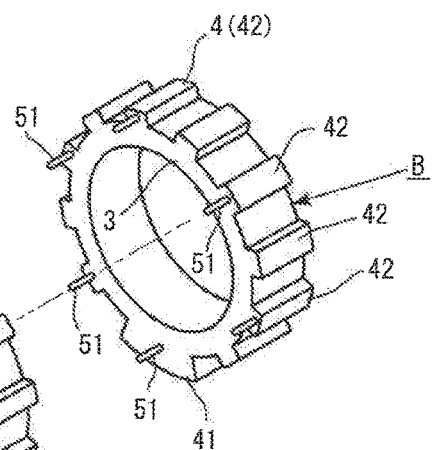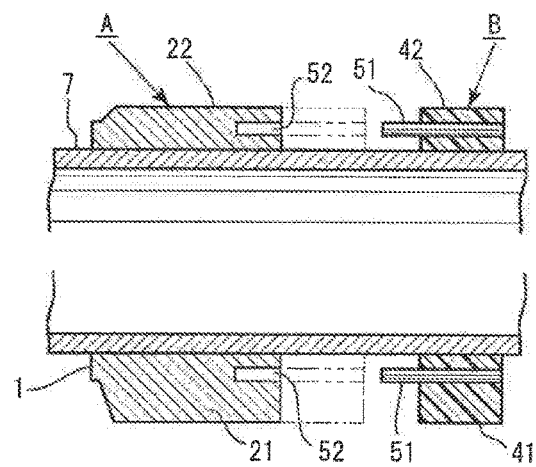

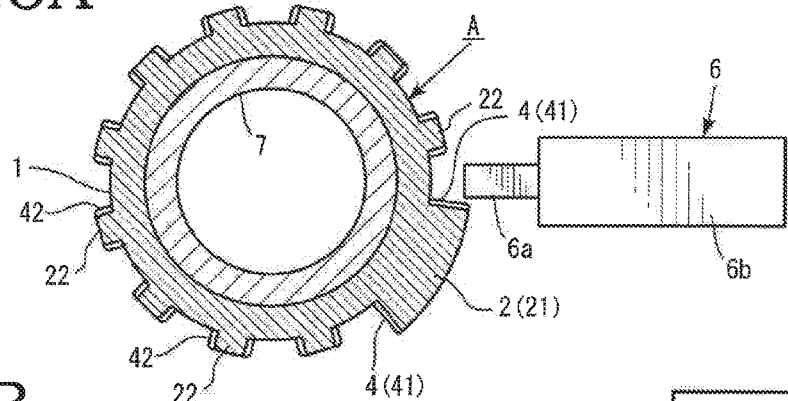
Fig.3A
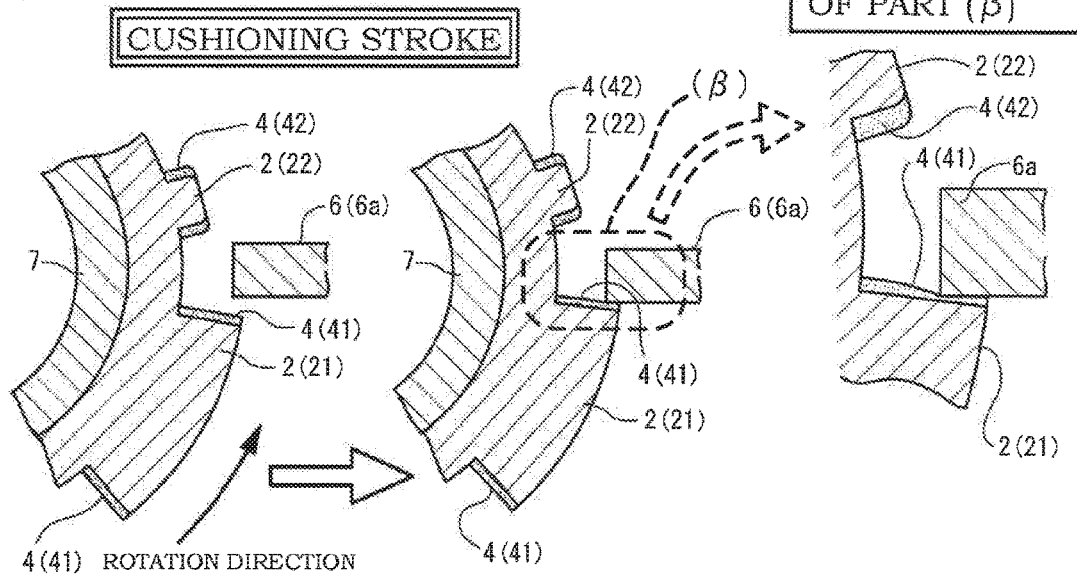
Fig.3B
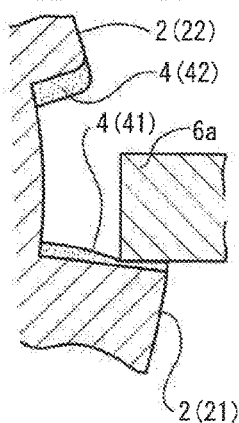
Fig.3C ENLARGEMENT OF PART (β)
GRAPH SHOWING CUSHIONING CHARACTERISTICS
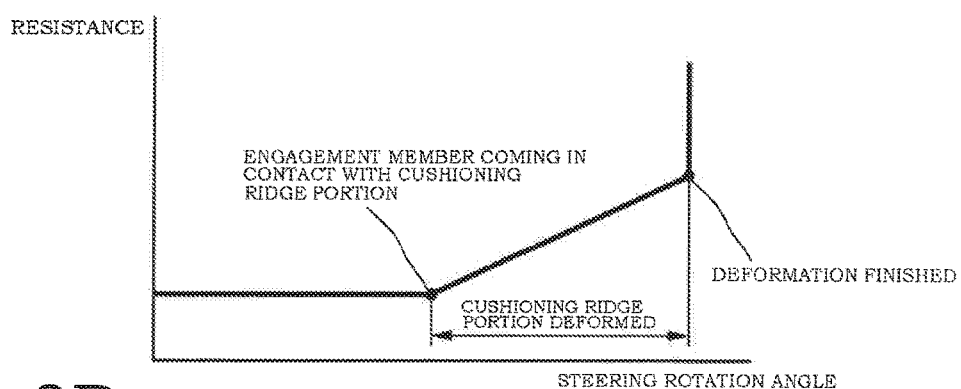
Fig.3D

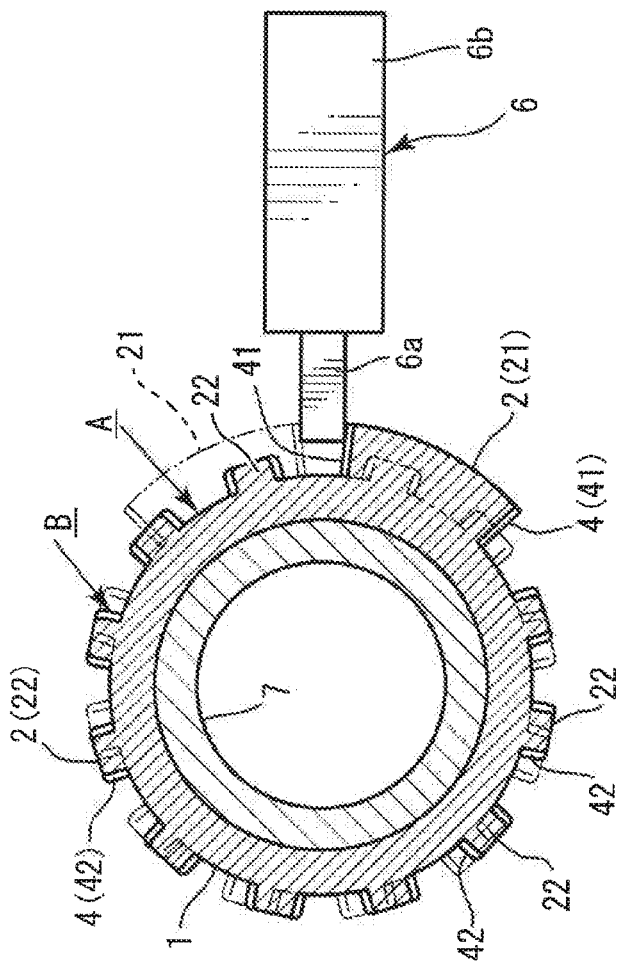
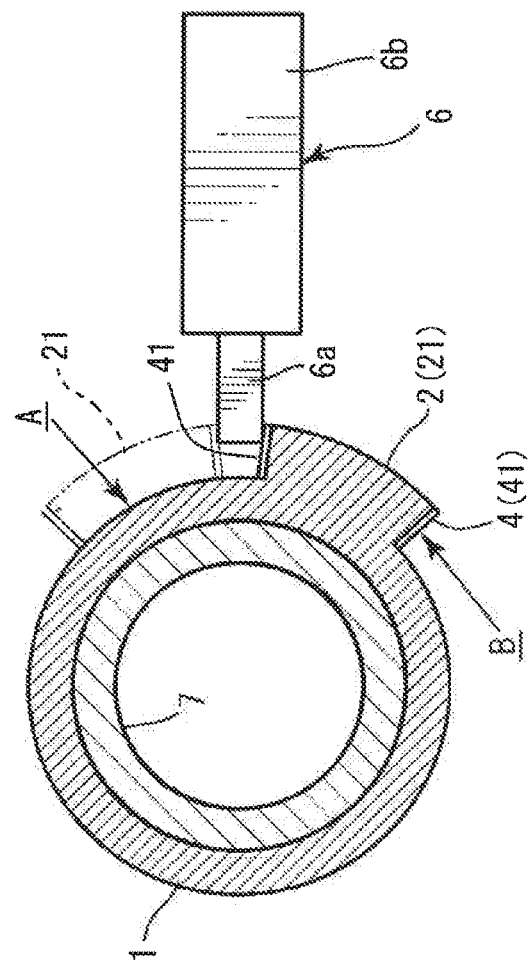
Fig. 4A
Fig. 4B

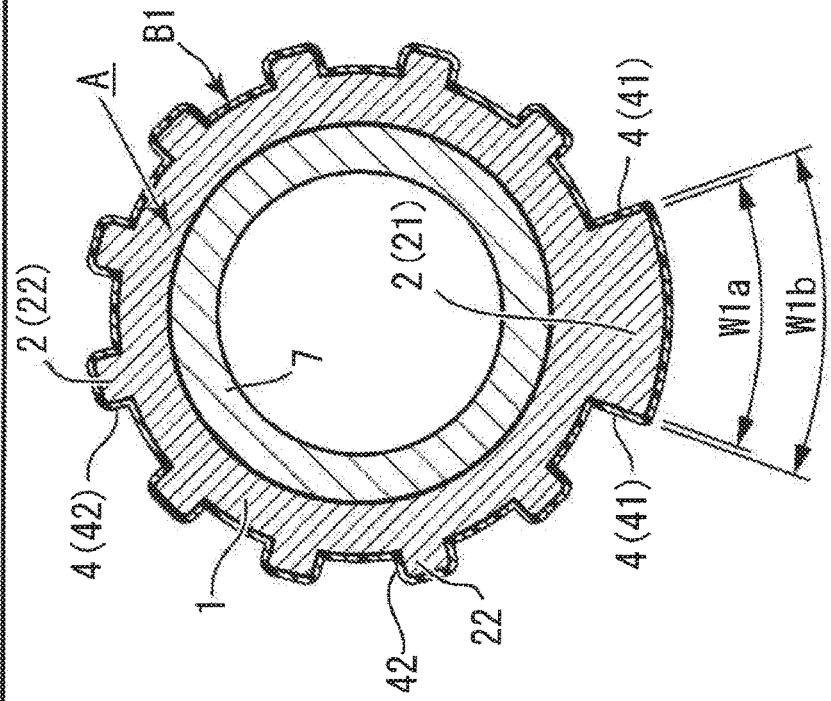
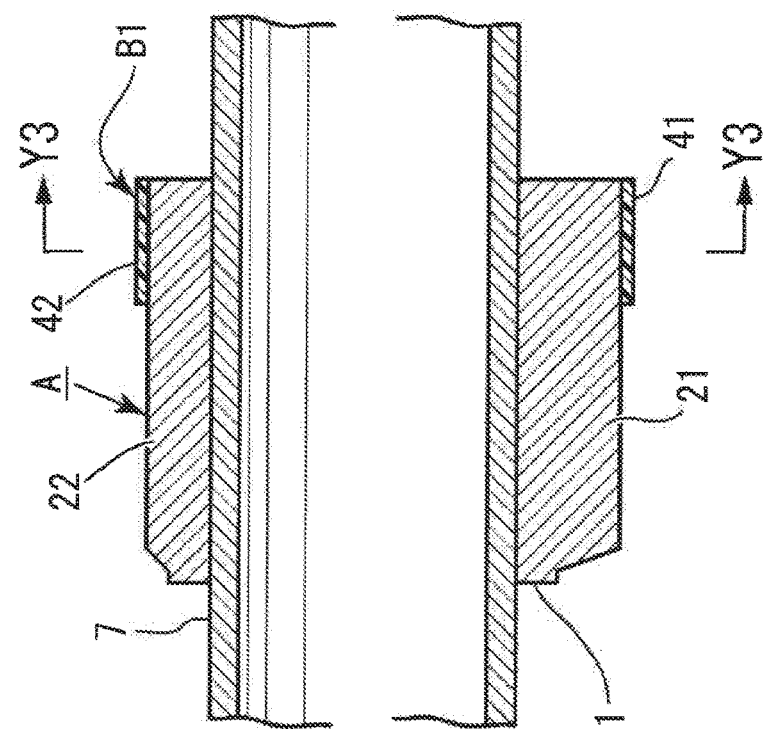

ENLARGEMENT OF PART (γ)

STEERING DEVICE

BACKGROUND OF THE INVENTION

1. Field of the Invention

The present invention relates to a steer-by-wire steering device, and particularly to a steering device capable of buffering an impact received at the time of restricting rotation in steering operation.

2. Description of the Related Art

In a steer-by-wire steering device, the steering shaft and the steering mechanism portion are not mechanically connected, so that a function of restricting the rotation range of the steering wheel is required. Japanese Patent Application Publication No. 2010-162983 discloses a typical steering devices provided with the mechanism for restricting rotation in steering operation. Further, Japanese Patent Application Publication No. 2010-162983 discloses a lock mechanism of the steering wheel functioned during a non-driving state of an automobile.

SUMMARY OF THE INVENTION

Japanese Patent Application Publication No. 2010-162983, discloses a rotation-restricting mechanism and a lock mechanism including a flange mounted on a steering shaft and an engagement pin. The flange has a ridge portion for restricting the rotation of the steering operation when the vehicle runs and a concave portion for locking the steering wheel when the engine is deactivated. Further, the engagement pin mechanically moves inward and outward along the axial direction.

In the above configuration, the rotation restriction of the steering wheel in steering operation is achieved by the contact of the ridge portion of the flange with the engagement pin. At this time, when the rotation of the steering wheel by a predetermined angle causes the ridge portion of the flange to come in contact with the engagement pin, the driver receives a slight impact on his/her hand(s) holding the steering wheel. This impact may make the driver feel uncomfortable.

An object of the present invention is to provide a steering device having a steer-by-wire mechanism, and particularly to a steering device capable of buffering an impact received at the time of rotation-restricting in steering operation.

Accordingly, the inventor has conducted intensive researches to solve the above problems, and as a result, provide a steer-by-wire (or sometimes referred to as "steering-by-wire") steering device as a first aspect of the present invention to solve the problems. The steering device includes a steering shaft, a rotation-restricting member including an annular main cylindrical portion mounted on the steering shaft and at least one main ridge portion formed on an outer periphery of the main cylindrical portion, an engagement member configured to move in proximity to and away from the rotation-restricting member, and a cushioning member, wherein the engagement member and the main ridge portion are configured to come in contact with each other through the cushioning member in conjunction with rotation of the steering shaft.

In the steering device according to the first aspect, provided as a second aspect of the present invention to solve the problems is a steering device in which only a single ridge main portion is formed on the main cylindrical portion, and the main ridge portion serves as a rotation-restricting ridge portion. In the steering device according to the first aspect, provided as a third aspect of the present invention to solve the problems is a steering device in which a plurality of main ridge portions are provided on the main cylindrical portion, where one of the main ridge portions serves as a rotation-restricting ridge portion, and the other main ridge portions serve as locking ridge portions.

In the steering device according to the first or third aspect, provided as a fourth aspect of the present invention to solve the problems is a steering device in which the cushioning member includes an annular sub-cylindrical portion and a cushioning ridge portion formed on an outer periphery of the sub-cylindrical portion, and a widthwise dimension of the cushioning ridge portion is larger than a widthwise dimension of the main ridge portion.

In the steering device according to the first or third aspect, provided as a fifth aspect of the present invention to solve the problems is a steering device in which the cushioning member is provided as a coated cushioning member in which a resin coating is formed in a predetermined area on apart of the main ridge portion of the rotation-restricting member in an axial direction.

In the steering device according to the first or third aspect, provided as a sixth aspect of the present invention to solve the problems is a steering device in which the cushioning member is provided as a tip-coated cushioning member in which a resin coating is formed on a part or whole of a tip portion of the engagement member. In the steering device according to the sixth aspect, provided as a seventh aspect of the present invention to solve the problems is a steering device in which a penetrating portion is formed in a part of the tip portion of the engagement member, and the cushioning member is provided as the tip-coated cushioning member provided by filling the penetrating portion with a resin and forming a resign coating on both surfaces of the tip portion.

In the present invention, the engagement member and the main ridge portion are configured to come in contact with each other through the cushioning member in conjunction with the rotation of the steering shaft, thereby making it possible to buffer an impact at the time of end of the operation in the rotation-restricting of steering operation and provide good operation feeling.

BRIEF DESCRIPTION OF THE DRAWINGS

FIG. 1A is a schematic view of a steering device according to the present invention;

FIG. 1B is an enlarged detail view of ($\alpha$) of FIG. 1A;

FIG. 1C is a side view of main parts illustrating an assembled state of a steering shaft, a rotation-restricting member, and a cushioning member;

FIG. 1D is an enlarged sectional view taken along an arrow Y1-Y1 of FIG. 1C;

FIG. 1E is an enlarged sectional view taken along an arrow Y2-Y2 of FIG. 1C;

FIG. 2A is a perspective view of main parts illustrating an assembled state of a steering shaft, a rotation-restricting member, and a cushioning member, and an engagement member according to a first embodiment of the present invention;

FIG. 2B is a perspective view of the rotation-restricting member;

FIG. 2C is a perspective view of the cushioning member;

FIG. 2D is a side sectional elevational view of main parts illustrating an assembled state of the rotation-restricting member and the cushioning member;

FIG. 3A is a front sectional elevational view of main parts illustrating an engaged state of the steering shaft, the rotation-restricting member, and the cushioning member with the engagement member according to the first embodiment of the present invention;

FIG. 3B is an enlarged view of main parts illustrating a cushion stroke performed by a rotation-restricting ridge portion and the engagement member in rotation-restricting of a steering wheel;

FIG. 3C is an enlarged view of part (β) of FIG. 3B;

FIG. 3D is a graph showing cushion characteristics;

FIG. 4A is a front sectional elevational view illustrating an engaged state of the steering shaft, the rotation-restricting member, and the cushioning member with the engagement member;

FIG. 4B is a front sectional elevational view illustrating an engaged state of the steering shaft, the rotation-restricting member, and the cushioning member with the engagement member in the case where a steering-wheel rotation-restricting mechanism is used alone;

FIG. 5A is a side sectional elevational view illustrating a second embodiment of the present invention;

FIG. 5B is an enlarged sectional view taken along an arrow Y3-Y3 of FIG. 5A;

DESCRIPTION OF THE PREFERRED EMBODIMENTS

Figure 6A:
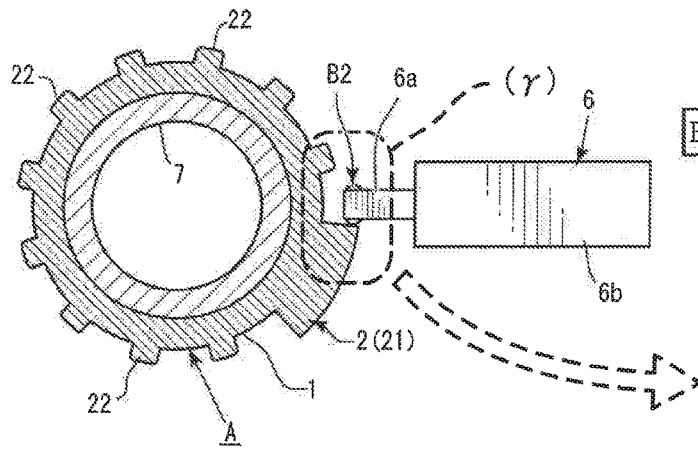
FIG. 6A is a front sectional elevational view of main parts of a third embodiment of the present invention.
Figure 6B:
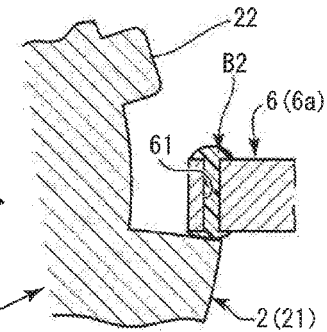
FIG. 6B is an enlarged view of part (γ) of FIG. 6A.
Figure 6C:
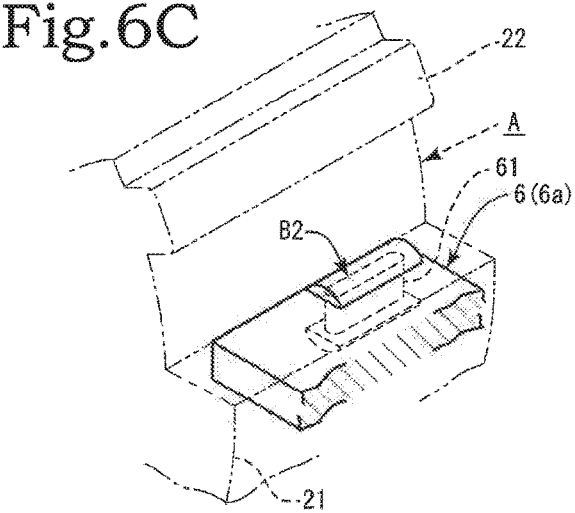
FIGS. 6C and 6D are perspective views of main parts of an engagement member and a cushioning member according to the third embodiment.

Hereinafter, embodiments of the present invention will be described with reference to the drawings. As used herein, the terms "front side" and "rear side" are used herein to indicate a directions in the present invention. The front side and the rear side are defined on the basis of the front and rear direction of an automobile with a steering device of the present invention mounted on the automobile. Specifically, in each component of the steering device, the front wheel side of the automobile is defined as the front side, and a steering wheel 8 side is defined as the rear side (see FIG. 1A).

The present invention relates mainly to a steering device with a steer-by-wire system. A steer-by-wire system is a system in which steering is performed by transmitting electric signals. In a steering devices employing such a steer-by-wire system, a steering shaft and a steering part are not coupled with each other and a steering unit is operated via the electric signal. According to the present invention, in order to prevent the theft of an automobile, a steering wheel rotation-restricting mechanism is installed in a steering wheel lock mechanism for making the steering wheel non-rotatable so as to buffer an impact received at the time of the end of steering operation.

As illustrated in FIG. 1, the present invention mainly includes a rotation-restricting member A, a cushioning member B, an engagement member 6, a steering shaft 7, a steering wheel 8, a steering unit 9, and the like. Configurations of the present invention are provided as various embodiments. First, a first embodiment includes the rotation-restricting member A and the cushioning member B which is a separate member from the rotation-restricting member A (see FIGS. 1C to 1D and FIG. 2).

The rotation-restricting member A includes a main cylindrical portion 1 and main ridge portions 2. The main cylindrical portion 1 has a cylindrical shape, and the inner diameter on the inner peripheral side, which is a circular shape, is substantially equal to the outer diameter of the steering shaft 7. Further, the steering shaft 7 penetrates the rotation-restricting member A on the inner peripheral side and is fixed in such a manner that the steering shaft 7 and rotation-restricting member A do not slip from each other, so that the rotation-restricting member A rotates in the circumferential direction as the steering shaft 7 rotates in the circumferential direction. The main cylindrical portion 1 is made of metal and has appropriate strength. Main ridge portions 2 are formed on the outer periphery of the main cylindrical portion 1. Each main ridge portion 2 is formed to have a protruded strip shape along the axial direction of the main cylindrical portion 1. The main ridge portions 2 are formed at equal intervals along the circumferential direction on the outer periphery of the main cylindrical portion 1 (see FIG. 1D).

The cross-sectional shape of the main ridge portion 2 is substantially square. The rotation-restricting member A made up of the main cylindrical portion 1 and the plurality of main ridge portions 2 has a substantially spline shape (see FIGS. 2A and 2B). One of the plurality of main ridge portions 2 is a rotation-restricting ridge portion 21, and the other main ridge portions are all locking ridge portions 22 (see FIGS. 1C to 1D and FIG. 2). When the engine is in operation but in a stop state while the automobile is running or idling, the rotation-restricting ridge portion 21 functions to restrict the rotation range of the steering wheel 8, that is, the rotation range of the rotation-restricting member A.

The locking ridge portions 22 are arranged at equal intervals along the circumferential direction on the outer periphery of the main cylindrical portion 1, and form a recessed portion between the locking ridge portions 22 adjacent to each other (see FIG. 1D). When the steering wheel is locked, the tip of an engagement pin portion 6a of the engagement member 6 is inserted between the adjacent locking ridge portions 22, that is, into the recessed portion, thereby locking the operation of the steering wheel 8 while the engine is stopped. On the outer periphery of the main cylindrical portion 1, the rotation-restricting ridge portion 21 occupies a region larger than the locking ridge portion 22 (see FIG. 1D).

In the embodiment illustrated, the rotation-restricting ridge portion 21 has a width approximately twice and a height approximately twice as long as those of the locking ridge portion 22. The engagement member 6 includes the engagement pin portion 6a and a retracting and extending mechanism portion 6b so that the locking pin portion 6a extends and retracts from the retracting and extending mechanism portion 6b in a retracting and extending direction. The engagement pin portion 6a is preferably made of metal. Normally, the engagement pin portion 6a does not come in contact with the locking ridge portion 22 and protrudes to be able to come in contact with a side surface of the rotation-restricting ridge portion 21. Specifically, the engagement pin portion 6a is formed to have a strip shape, which is able to come in contact with both the main ridge portion 2 of the rotation-restricting member A and a cushioning ridge portion 4 of the cushioning member B (see FIG. 2A).

As used herein, the side surface for the rotation-restricting ridge portion 21 refers to a surface perpendicular to the rotation direction in the circumferential direction of the rotation-restricting member A (including a surface substantially perpendicular to the rotation direction). Further, when the steering wheel 8 is locked, the engagement pin portion 6a moves to protrude so as to be inserted between adjacent locking ridge portions 22 of the main ridge portion 2 to be able to come in contact with their respective side surfaces (surfaces substantially perpendicular to the rotation direction). With the above configuration, the rotation range of the steering wheel 8 is restricted.

In the first embodiment, the cushioning member B is a separate member from the rotation-restricting member A (see FIGS. 2B to 2D). The cushioning member B is fixed to the rotation-restricting member A or fixed to the steering shaft 7 so as to rotate in the circumferential direction together with the rotation-restricting member A. Further, the cushioning member B comes in contact with either the rotation-restricting member A or the engagement member 6 first, and also comes in contact with either the main ridge portion 2 of the rotation-restricting member A or the engagement member 6 prior to contact of the main ridge portion 2 of the rotation-restricting member A with the engagement member 6. In the first embodiment of the present invention, the engagement pin portion 6a of the engagement member 6 comes in contact with the cushioning member B first (see FIGS. 3A and 3B).

The cushioning member B is made of a material having a cushion property. Specifically, it is a synthetic resin, a rubber material or the like. The cushioning member B mainly includes a sub-cylindrical portion 3 and the cushioning ridge portion 4 (see FIG. 1E and FIG. 2C). The sub-cylindrical portion 3 has the same inner diameter as the main cylindrical portion 1 and has substantially the same thickness. The number of cushioning ridge portions 4 is equal to the number of main ridge portions 2 of the rotation-restricting member A (see FIGS. 1D and 1E, and FIGS. 2A to 2C).

The cushioning ridge portion 4 has a rotation-restricting cushioning ridge portion 41 corresponding to the rotation-restricting ridge portion 21 of the main ridge portion 2 and also a lock cushioning ridge portion 42 corresponding to the locking ridge portion 22 (see FIGS. 1D and 1E, and FIGS. 2A to 2C). Further, the widthwise dimension W1b of the rotation-restricting cushioning ridge portion 41 is set to be larger than the widthwise dimension W1a of the rotation-restricting ridge portion 21 (see FIG. 1).

That is,

W1b>W1a.

It is noted that the rotation-restricting ridge portion 21 and the rotation-restricting cushioning ridge portion 41 are substantially fan-like, inverted-trapezoid shaped (shell shaped), so that their dimension reference lines are substantially V-shaped. In particular, even when the rotation-restricting ridge portion 21 and the rotation-restricting cushioning ridge portion 41 are positioned at any possible position, the widthwise dimension W1b of the rotation-restricting cushioning ridge portion 41 is always set to be larger than the widthwise dimension W1a of the rotation-restricting ridge portion 21.

The widthwise dimension W2b of the lock cushioning ridge portion 42 is also set to be larger than the widthwise dimension W2a of the locking ridge portion 22 (see FIG. 1).

That is,

W2b>W2a.

The sub-cylindrical portion 3 of the cushioning member B is adjacent to the rotation-restricting member A in its axial direction, and the steering shaft 7 penetrates the sub-cylindrical portion 3 on its inner peripheral side so that the cushioning member B is mounted on the steering shaft 7. The main ridge portions 2 and the cushioning ridge portions 4 are arranged in a straight line along the axial direction (see FIG. 1C and FIG. 2A). Specifically, the rotation-restricting ridge portion 21 and the rotation-restricting cushioning ridge portion 41 are arranged in a straight line in the axial direction, and the plurality of other lock projections 22 and the plurality of other lock cushioning ridge portions 42 in pair are arranged in a straight line in the axial direction.

Further, as described above, the widthwise dimensions (W1b and W2b) of the cushioning ridge portions 4 (the rotation-restricting cushioning ridge portion 41 and the lock cushioning ridge portions 42) are set to be larger than the widthwise dimensions (W1a and W2a) of the main ridge portions 2 (the rotation-restricting ridge portion 21 and the locking ridge portions 22). Accordingly, both sides of the cushioning ridge portion 4 in the width direction are configured to protrude out from both sides of the main ridge portion 2 in the width direction.

In other words, both sides of the rotation-restricting cushioning ridge portion 41 in the width direction protrude out from both sides of the rotation-restricting ridge portion 21 in the width direction. Similarly, both sides of the lock cushioning ridge portion 42 in the width direction protrude out from both sides of the locking ridge portion 22 in the width direction (see FIG. 1D, FIG. 2A, and FIGS. 3A and 3B, etc.).

In an example of the fixing structure of the cushioning member B to the steering shaft 7, at least one of the rotation-restricting member A and the cushioning member B may be provided with connection pins 51 for positioning and the other may have pin holes 52 into which the connection pins are inserted (see FIGS. 2B to 2D). The connection pins 51 and the pin holes 52 is the same in number, and the main ridge portions 2 (the rotation-restricting ridge portion 21 and the locking ridge portions 22) of the rotation-restricting member A and the cushioning ridge portions 4 (the rotation-restricting cushioning ridge portion 41 and the lock cushioning ridge portions 42) are arranged to be connected with each other in exact coincidence with their positions. In the embodiment illustrated, the connection pins 51 are provided in the cushioning member B, and the pin holes 52 are provided in the rotation-restricting member A. Further, the connection pins 51 and the pin holes 52 may be provided in both the rotation-restricting member A and the cushioning member B.

The engagement pin portion 6a of the engagement member 6 mechanically retracts and extends. In the state where the rotation of the steering wheel 8 is restricted during normal travel, the engagement pin portion 6a of the engagement member 6 does not come in contact with the locking ridge portion 22 and the lock cushioning ridge portion 42. The amount of protrusion of the engagement pin portion 6a with respect to the retracting and extending mechanism portion 6b is set so that the engagement pin portion 6a can come in contact with only the side surfaces of the rotation-restricting ridge portion 21 and the rotation-restricting cushioning ridge portion 41 (surfaces substantially perpendicular to the rotation direction) (see FIG. 4A).

Further, at the time of steering wheel lock, the engagement pin portion 6a of the engagement member 6 moves to protrude and is inserted into the recessed portion between the locking ridge portions 22 and between the lock cushioning ridge portions 42. In the first embodiment of the present invention, at the time of steering wheel rotation-restricting, the engagement pin portion 6a of the engagement member 6 comes in contact with only the side surfaces of the rotation-restricting ridge portion 21 and the rotation-restricting cushioning ridge portion 41 (surfaces substantially perpendicular to the rotation direction).

At the time of steering wheel rotation restriction, the engagement pin portion 6a of the engagement member 6 comes in contact with the side surface of the rotation-restricting cushioning ridge portion 41 of the cushioning member B (surface substantially perpendicular to the rotation direction) and does not come in contact with but is located just in close proximity to the side surface of the rotation-restricting ridge portion 21 of the rotation-restricting member A (surface substantially perpendicular to the rotation direction), or alternatively comes in contact with the side surface of the rotation-restricting ridge portion 21 after coming in contact with the side surface of the rotation-restricting cushioning ridge portion 41 (see FIGS. 3A to 3C). That is, the engagement pin portion 6a of the engagement member 6 comes in contact with the side surface of the rotation-restricting cushioning ridge portion 41 of the cushioning member B first to cushion an impact.

Illustrated in FIG. 3B is a stroke in which the engagement pin portion 6a of the engagement member 6 comes in contact with the side surface of the rotation-restricting cushioning ridge portion 41 of the cushioning member B first. Further, FIG. 3D is a graph of cushion characteristics showing a relationship between the steering angle of the steering wheel 8 and the resistance in the stroke in which the engagement pin portion 6a of the engagement member 6 comes in contact with the side surface of the rotation-restricting cushioning ridge portion 41 of the cushioning member B first. Further, the steering wheel lock mechanism and the steering wheel rotation-restricting mechanism may be provided as separate members. The steering wheel rotation-restricting mechanism in the present embodiment does not have the locking ridge portions 22 and the lock cushioning ridge portions 42, and has only the rotation-restricting ridge portion 21 and the rotation-restricting cushioning ridge portion 41 (see FIG. 4B).

In a second embodiment, the cushioning member B is provided as a coated cushioning member B1 in which a resin coating is formed in a predetermined area on a part of the main ridge portion 2 of the rotation-restricting member A in the axial direction. In the present embodiment, a predetermined area in any portion of the rotation-restricting ridge portion 21 and the locking ridge portion 22 which constitute the ridge portion 2 in the axial direction is coated with a resin, serving as the coated cushioning member B1 (see FIG. 5).

The coated cushioning member B1 is provided corresponding to the position of contact with the engagement pin portion 6a of the engagement member 6 on the rotation-restricting ridge portion 21 and the locking ridge portion 22. It is preferable that the coated cushioning member B1 be provided on one end side and on the rear side in the axial direction of the main cylindrical portion 1. In the coated cushioning member B1, the resin-coated portion of the rotation-restricting ridge portion 21 serves as the rotation-restricting cushioning ridge portion 41.

In the second embodiment, the engagement pin portion 6a of the engagement member 6 at the time of steering wheel rotation-restricting comes in contact with the side surface of the rotation-restricting cushioning ridge portion 41 which is the resin-coated portion of the rotation-restricting ridge portion 21 (surface substantially perpendicular to the rotation direction) and does not come in contact with but is located just in close proximity to the side surface of the rotation-restricting ridge portion 21 which is not coated with resin (surface substantially perpendicular to the rotation direction), or alternatively comes in contact with the side surface of the rotation-restricting ridge portion 21 after coming in contact with the side surface of the rotation-restricting cushioning ridge portion 41. That is, the engagement pin portion 6a of the engagement member 6 comes in contact with the side surface of the rotation-restricting cushioning ridge portion 41 of the cushioning member B first to cushion an impact.

Next, in a third embodiment of the present invention, the cushioning member B is provided as a Tip-coated cushioning member B2 in which a resin coating is formed on a part or whole of a tip portion of the engagement pin portion 6a of the engagement member 6 (see FIG. 6). In the third embodiment, the cushioning member B is not provided on the rotation-restricting member A side as in the first and second embodiments described above. In the Tip-coated cushioning member B2, a penetrating portion 61 is formed in a part of the tip portion of the engagement pin portion 6a of the engagement member 6 and is filled with resin, and a resign coat is formed on both surfaces of the tip portion (see FIGS. 6A and 6B).

Figure 6D:
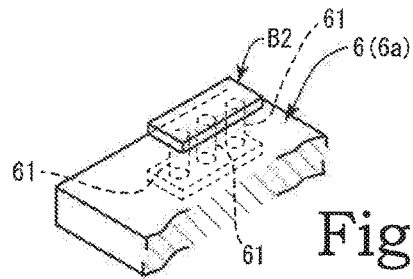
Figure 6E:
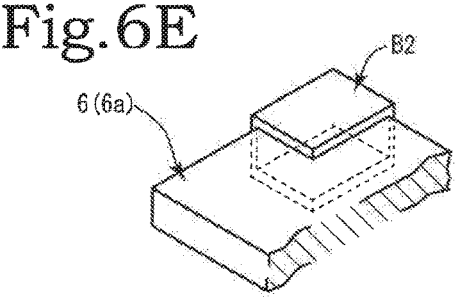
FIGS. 6E and 6F are perspective views of main parts illustrating a modification of the engagement member and the cushioning member according to the third embodiment.
Figure 6F:
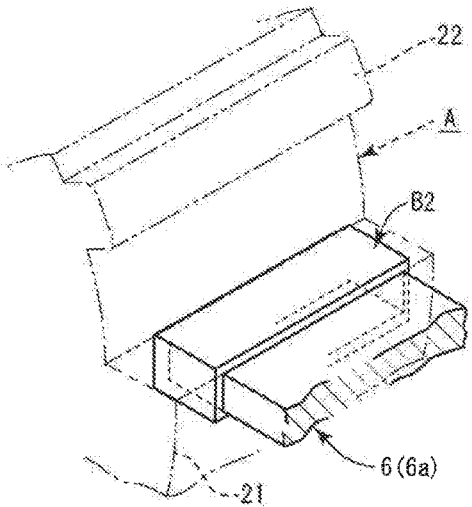

The penetrating portion 61 may be a stripe-shaped groove hole (see FIG. 6C) or a plurality of small diameter holes (see FIG. 6D). Further, a molten resin is poured into the penetrating portion 61 to be filled, and a resin coating is formed on both surfaces of the tip portion of the engagement pin portion 6a of the engagement member 6 to form the Tip-coated cushioning member B2. Furthermore, as a modification of the third embodiment, there is also provided a type of the Tip-coated cushioning member B2 in which the tip of the engagement pin portion 6a of the engagement member 6 is simply coated with resin, and a first modification provides a resin coating which is applied on a part of the tip of the engagement pin portion 6a (see FIG. 6E). Further, a second modification of the third embodiment provides a resin coating which is applied on the whole tip of the engagement pin portion 6a (see FIG. 6F).

In the present embodiment, at the time of at the time of steering operation, when the engagement pin portion 6a of the engagement member 6 is about to come in contact with the side surface of the rotation-restricting ridge portion 21 of the rotation-restricting member A, the rotation-restricting ridge portion 21 comes in contact with the Tip-coated cushioning member B2 of the engagement pin portion 6a of the engagement member 6, thereby making is possible to buffer an impact. The embodiments described above show the configuration in which the engagement pin portion 6a of the engagement member 6 comes in contact with the side surface of the rotation-restricting cushioning ridge portion 41 at the time of steering wheel rotation-restricting; however, the present invention is not limited to that configuration. It may be a configuration in which the amount of protrusion of the engagement pin portion 6a of the engagement member 6 is controlled so that the rotation-restricting cushioning ridge portion 41 is not formed and the lock cushioning ridge portion 42 is used alone.

In the second embodiment, the main cylindrical portion has a single main ridge portion and the main ridge portion serves as the rotation-restricting ridge portion to simplify the configuration of restricting the rotation of the steering wheel at the time of steering operation, thereby making it possible to buffer an impact received at the time of the end of steering operation. In the third embodiment, the plurality of main ridge portions are provided on the main cylindrical portion, one of the main ridge portions serves as the rotation-restricting ridge portion and the other main ridge portions serve as locking ridge portions, so that the configuration of restricting the rotation of the steering wheel at the time of steering operation can be easily incorporated into conventional mechanisms at the time of steering wheel lock, thereby making it possible to buffer an impact received at the time of the end of steering operation. In a fourth embodiment, the configuration in the present invention can be made the simplest, and assembling can also be simplified.

In a fifth embodiment, the cushioning member is provided as a coated cushioning member in which a resin coating is formed in a predetermined area on a part of the main ridge portion of the rotation-restricting member in the axial direction, so that the number of parts in the configuration of the present invention can be reduced, thereby making it possible to simplify manufacturing. In sixth and seventh embodiments, the cushioning member is provided as a Tip-coated cushioning member in which a resin coating is formed on a part or whole of the tip portion of the engagement member, so that a simple configuration of only the rotation-restricting member and the engagement member can be provided.

What is claimed is:

1. A steer-by-wire steering device, comprising:
   a steering shaft;
   a rotation-restricting member including an annular main cylindrical portion mounted on the steering shaft and at least one main ridge portion formed on an outer periphery of the main cylindrical portion;
   an engagement member configured to move in proximity to and away from the rotation-restricting member; and
   a cushioning member,
   wherein the engagement member and the at least one main ridge portion are configured to come in contact with each other through the cushioning member in conjunction with rotation of the steering shaft.

2. The steering device according to claim 1, wherein
   the at least one main ridge portion is a single ridge main portion, and
   only the single ridge main portion is formed on the main cylindrical portion, and the main ridge portion serves as a rotation-restricting ridge portion.

3. The steering device according to claim 1, wherein
   the at least one main ridge portion includes a plurality of main ridge portions, and
   the plurality of main ridge portions are provided on the main cylindrical portion, where one of the main ridge portions serves as a rotation-restricting ridge portion and the other main ridge portions serve as locking ridge portions.

4. The steering device according to claim 1, wherein
   the cushioning member includes an annular sub-cylindrical portion and a cushioning ridge portion formed on an outer periphery of the sub-cylindrical portion, and a widthwise dimension of the cushioning ridge portion is larger than a widthwise dimension of the main ridge portion.

5. The steering device according to claim 1, wherein
   the cushioning member is provided as a coated cushioning member in which a resin coating is formed in a predetermined area on a part of the main ridge portion of the rotation-restricting member in an axial direction.

6. The steering device according to claim 1, wherein
   the cushioning member is provided as a tip-coated cushioning member in which a resin coating is formed on a part or whole of a tip portion of the engagement member.

7. The steering device according to claim 6, wherein
   a penetrating portion is formed in a part of the tip portion of the engagement member, and
   the cushioning member is provided as the tip-coated cushioning member provided by filling the penetrating portion with a resin and forming a resign coating on both surfaces of the tip portion.

* * * * *